(12) United States Patent
Cerosaletti et al.

(10) Patent No.: US 8,238,615 B2
(45) Date of Patent: *Aug. 7, 2012

(54) METHOD FOR COMPARING PHOTOGRAPHER AESTHETIC QUALITY

(75) Inventors: Cathleen D. Cerosaletti, Rochester, NY (US); Alexander C. Loui, Penfield, NY (US); Andrew C. Gallagher, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 503 days.

This patent is subject to a terminal disclaimer.

(21) Appl. No.: 12/566,722

(22) Filed: Sep. 25, 2009

(65) Prior Publication Data

US 2011/0075930 A1 Mar. 31, 2011

(51) Int. Cl.
*G06K 9/00* (2006.01)
*G06K 9/46* (2006.01)
*G06K 9/66* (2006.01)
*G06Q 10/00* (2012.01)

(52) U.S. Cl. .......... 382/112; 382/190; 705/7.38
(58) Field of Classification Search .......... 382/112, 382/190, 192, 224, 274, 275; 705/7.38–7.42
See application file for complete search history.

(56) References Cited

U.S. PATENT DOCUMENTS

| | | | |
|---|---|---|---|
| 5,164,831 A | 11/1992 | Kuchta et al. | |
| 5,694,484 A | 12/1997 | Cottrell et al. | |
| 5,875,265 A | 2/1999 | Kasao | |
| 6,282,317 B1 | 8/2001 | Luo et al. | |
| 6,516,154 B1 | 2/2003 | Parulski et al. | |
| 6,671,405 B1 | 12/2003 | Savakis et al. | |
| 6,778,699 B1 | 8/2004 | Gallagher | |
| 6,816,847 B1 | 11/2004 | Toyama | |
| 6,930,718 B2 | 8/2005 | Parulski et al. | |
| 7,545,985 B2 * | 6/2009 | Zhang et al. | 382/224 |
| 7,764,844 B2 * | 7/2010 | Bouk et al. | 382/250 |
| 7,840,084 B2 * | 11/2010 | Bouk et al. | 382/250 |
| 7,873,231 B2 * | 1/2011 | Bouk et al. | 382/254 |
| 8,064,710 B2 * | 11/2011 | Mizoguchi | 382/233 |
| 2004/0075743 A1 | 4/2004 | Chatani et al. | |
| 2006/0031089 A1 * | 2/2006 | Tarr et al. | 705/1 |
| 2006/0031090 A1 * | 2/2006 | Tarr et al. | 705/1 |
| 2006/0031091 A1 * | 2/2006 | Tarr et al. | 705/1 |
| 2006/0036466 A1 * | 2/2006 | Tarr et al. | 705/1 |
| 2006/0036467 A1 * | 2/2006 | Tarr et al. | 705/1 |
| 2006/0120618 A1 * | 6/2006 | Mizoguchi | 382/255 |
| 2006/0147107 A1 * | 7/2006 | Zhang et al. | 382/159 |

(Continued)

OTHER PUBLICATIONS

Ke, et al., "The Design of High-Level Features for Photo Quality Assessment," Proceedings of Computer Vision and Pattern Recognition, pp. 419-426, 2006.

(Continued)

*Primary Examiner* — Aaron W Carter
(74) *Attorney, Agent, or Firm* — Kevin E. Spaulding

(57) ABSTRACT

A method for comparing a plurality of photographers by assessing the aesthetic quality of a set of digital images captured by each photographer comprising: providing a set of digital images captured by each of a plurality of photographers; using a processor to determine an aesthetic quality parameter for each digital image in each of the sets of digital images, wherein the aesthetic quality parameter is an estimate for the aesthetic quality of the digital image; determining an aesthetic quality distribution for each photographer responsive to the aesthetic quality parameters computed for each of the digital images in the photographer's set of digital images; and providing a comparison between the aesthetic quality distributions of the photographers.

17 Claims, 15 Drawing Sheets

U.S. PATENT DOCUMENTS

| | | | |
|---|---|---|---|
| 2007/0263092 | A1 | 11/2007 | Fedorovskaya et al. |
| 2008/0285860 | A1 | 11/2008 | Datta et al. |
| 2011/0074966 | A1* | 3/2011 | Cerosaletti et al. ........ 348/222.1 |
| 2011/0075917 | A1* | 3/2011 | Cerosaletti et al. ........... 382/159 |
| 2011/0075930 | A1* | 3/2011 | Cerosaletti et al. ........... 382/190 |

OTHER PUBLICATIONS

Viola, et al., "Robust Real-Time Face Detection," Int. Journal of Computer Vision, vol. 57, pp. 137-154 (2004).

Yuille, et al., "Feature Extraction from Faces Using Deformable Templates," Int. Journal of Computer Vision, vol. 8, pp. 99-111 (1992).

Cootes, et. al., "Constrained Active Appearance Models," 8th International Conference on Computer Vision, vol. 1, pp. 748-754, (2001).

Bolin and Chen, "An Automatic Facial Feature Finding System for Portrait Images," Proceedings of IS&T PICS Conference, 2002.

E. Peli, "*Contrast in Complex Images*" J. Opt. Soc. A, vol. A7, pp. 2032-2040 (1990).

Cerosaletti, et al, "Measuring the Perceived Aesthetic Quality of Photographic Images," Proceedings of the QOMEX Workshop, 2009.

J. Pearl, "Causality: Models, Reasoning, and Inference," Cambridge University Press, Cambridge, 2000.

Duda et al., "Pattern Classification," John Wiley and Sons, New York, 2001.

Wei Jiang et al.: "Automatic Aesthetic Value Assessment in Photographic Images", 2010 IEEE International Conference on Multimedia and Expo (ICME) IEEE Piscataway, NJ, USA, Jul. 19, 2010, Jul. 23, 2010, pp. 920-925, XP002615024, ISBN: 978-1-4244-7491-2, the whole document.

\* cited by examiner

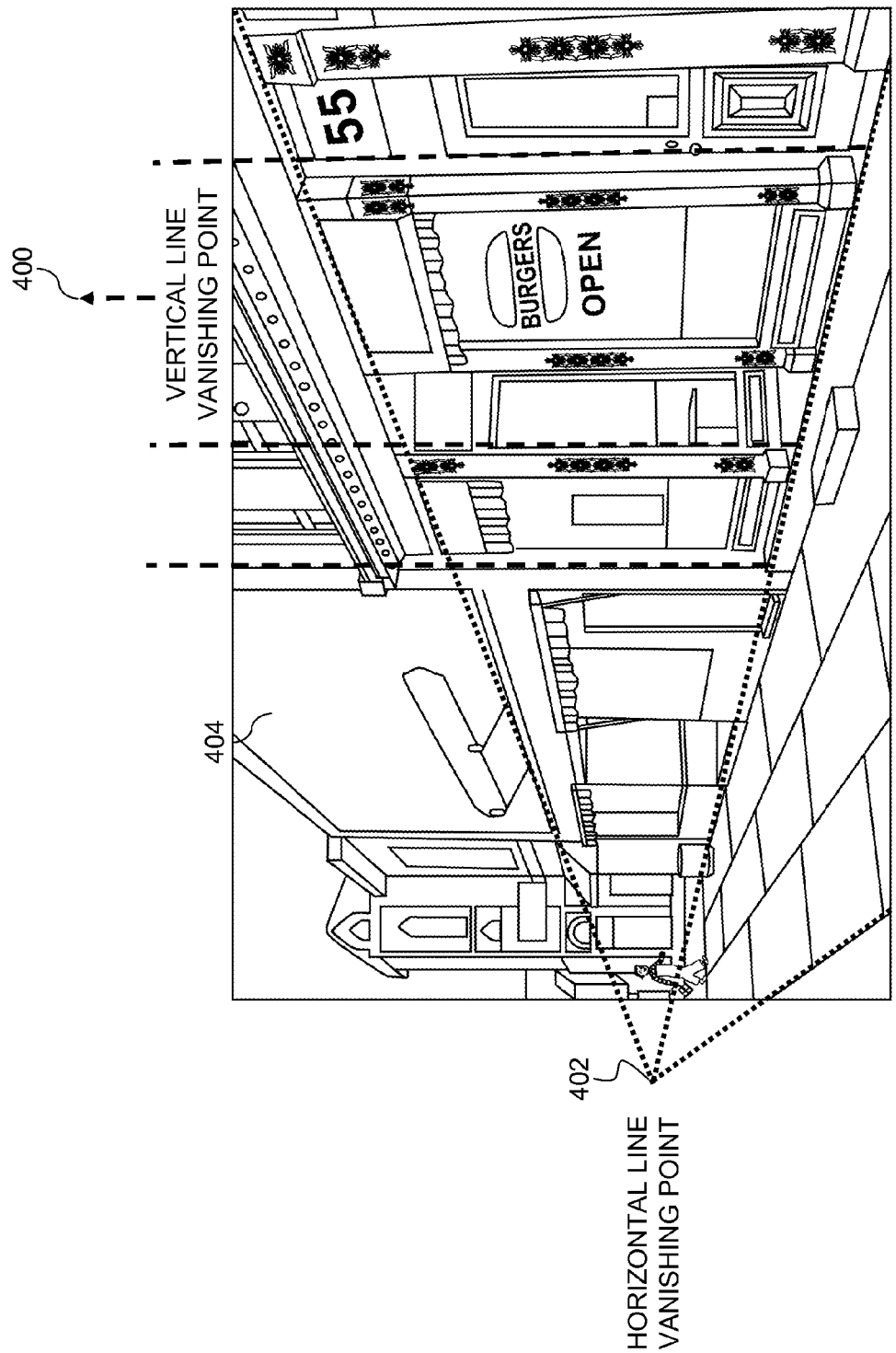

METHOD FOR COMPARING PHOTOGRAPHER AESTHETIC QUALITY

CROSS-REFERENCE TO RELATED APPLICATIONS

Reference is made to commonly assigned, co-pending U.S. patent application Ser. No. 12/566,706, entitled "Estimating Aesthetic Quality of Digital Images", by Cerosaletti, et al., and to commonly assigned, co-pending U.S. patent application Ser. No. 12/566,710, entitled "Method for Measuring Photographer's Aesthetic Quality Progress", by Cerosaletti, et al.

FIELD OF THE INVENTION

The present invention is related to the field of digital image processing and more specifically to automatically determining the aesthetic quality of media assets.

BACKGROUND OF THE INVENTION

Digital imaging has vastly increased the ability for users to amass very large numbers of still images, video image sequences, and multimedia records combining one or more images and other content. (Still images, audio recordings, video sequences, and multimedia records are referred to collectively herein with the term "media assets.") With very large numbers of media assets, organization becomes difficult.

Efforts have been made to aid users in organizing and utilizing media assets by assigning metadata to individual media assets that indicate a metric of expected value to the user. For example, the V-550 digital camera, marketed by Eastman Kodak Company of Rochester, N.Y., includes a user control labeled "Share," which can be actuated by the user to designate a respective image for preferential printing and e-mailing. This approach is useful, but limited by the metric being binary.

U.S. Pat. No. 5,694,484 to Cottrell, et al., entitled "System and method for automatically processing image data to provide images of optimal perceptual quality," describes a system involving several image processing modules and a method for selecting an image processing parameter that will optimize image quality for a given digital image, using information about the image capture device and the intended image output device. The method involves calculating an image quality metric that can be expressed as a series of mathematical transformations. The parameters used to control the image processing modules are varied, the image quality metric is calculated for each permutation of the control parameters, and the control parameters setting which yielded the best value of the image quality metric are used to process the digital image. The method of Cottrell et al. is performed on an individual image basis and therefore does not include an assessment of the quality of the digital image in either a relative or absolute basis relative to other digital images.

U.S. Pat. No. 6,671,405 to Savakis, et al., entitled "Method for automatic assessment of emphasis and appeal in consumer images," discloses an approach which computes a metric of "emphasis and appeal" of an image, without user intervention. A first metric is based upon a number of factors, which can include: image semantic content (e.g. people, faces); objective features (e.g., colorfulness and sharpness); and main subject features (e.g., size of the main subject). A second metric compares the factors relative to other images in a collection. The factors are integrated using a trained reasoning engine. The method described in U.S. Patent Application Publication No. 2004/0075743 by Chantani et al., entitled "System and method for digital image selection," is somewhat similar and discloses the sorting of images based upon user-selected parameters of semantic content or objective features in the images. These approaches have the advantage of working from the images themselves, but have the shortcoming of being computationally intensive.

U.S. Pat. No. 6,516,154 entitled "Image revising camera and method" and U.S. Pat. No. 6,930,718, entitled "Revised recapture camera and method," both to Parulski, et al., disclose a digital camera system which allows a user to revise a captured image relative to a set of editorial suggestions which include cropping and recentering the main subject of the image. In the method of U.S. Pat. No. 6,930,718, user input is provided with respect to a preferred editorial suggestion. The image is then edited based on the user preferred suggestion or the preferred parameters are recorded for later use. In the method of U.S. Pat. No. 6,516,154, the digital camera is set to a corresponding capture configuration based on user input with respect to the preferred editorial suggestion. These approaches have the disadvantage of requiring user input and are not performed completely automatically.

U.S. Patent Application Publication No. 2007/0263092 to Fedorovskaya, et al., entitled "Value index from incomplete data," discloses an image administration system and method to compute value indices from different combinations of capture data, intrinsic image data, image usage data, and user reaction data. This approach has the advantage of using combined data to calculate a value metric, but has the shortcoming of not utilizing data relevant to aesthetic value.

U.S. Patent Application Publication No. 2008/0285860 to Datta, et al., entitled "Studying aesthetics in photographic images using a computational approach," discloses an approach to compute the aesthetic quality of images in which a one-dimensional support vector machine is used to find features with a noticeable correlation with user aesthetic ratings. Then, automated classifiers are constructed utilizing a simple feature selection heuristic. Numerical aesthetic ratings are inferred. This invention has the feature of automatically computing aesthetic ratings.

U.S. Pat. No. 6,816,847 to Toyama, entitled "Computerized aesthetic judgment of images," discloses an approach to compute the aesthetic quality of images through the use of a trained and automated classifier based on features of the image. Recommendations to improve the aesthetic score based on the same features selected by the classifier can be generated with this method.

Ke, et al., in their article entitled "The design of high-level features for photo quality assessment" (Proc. Computer Vision and Pattern Recognition, pp. 419-426, 2006) disclose an approach to classify images as either "high quality professional photos" or "consumer snapshots." A number of features are proposed: spatial distribution of edges, color distribution, hue count, blur, contrast, and brightness. This approach is useful, but also limited by the metric being binary.

SUMMARY OF THE INVENTION

The present invention represents a method for comparing a plurality of photographers by assessing the aesthetic quality of a set of digital images captured by each photographer comprising:

a) providing a set of digital images captured by each of a plurality of photographers;

b) using a processor to determine an aesthetic quality parameter for each digital image in each of the sets of digital images, wherein the aesthetic quality parameter is an estimate for the aesthetic quality of the digital image;

c) determining an aesthetic quality distribution for each photographer responsive to the aesthetic quality parameters computed for each of the digital images in the photographer's set of digital images; and d) providing a comparison between the aesthetic quality distributions of the photographers.

The invention, in broader aspects, provides an image processing method and system in which the aesthetic quality is automatically assessed for media assets such as digital images and digital video. An aesthetic quality parameter is determined by analyzing the media asset to determine a compositional model which includes person features and vanishing point locations. Other image feathers that can be included in computation of aesthetic quality include color features, structure features, and capture features.

The present invention has the advantage that improved aesthetic quality parameters are determined by using a compositional model that includes vanishing point locations.

It has the additional advantage that the determined aesthetic quality parameters can be used to measure a photographer's progress over time toward producing images with a high level of aesthetic quality.

It has the further advantage that the determined aesthetic quality parameters can be used to provide a comparison between the aesthetic quality distributions for a plurality of photographers.

BRIEF DESCRIPTION OF THE DRAWINGS

FIG. 3A is a diagram illustrating horizontal and vertical line vanishing points;

DETAILED DESCRIPTION OF THE INVENTION

Digital capture devices have made it possible for consumers to capture and save vast numbers of media assets. The number of media assets can be overwhelming, making it difficult for consumers to find appropriate assets to share with their family or friends. Embodiments of the present invention provide ways to efficiently compute a metric, referred to herein as an "aesthetic quality parameter," which provides a measure of the aesthetic quality of media assets. The aesthetic quality parameter is an automatically computed metric for assessing the expected value of a media asset based upon its aesthetic quality. The aesthetic quality parameter is determined by extracting features related to people, vanishing points, and color and structure.

The phrase "media asset," as used herein, refers to any media asset, such as a digital still image, or a digital video file. Further, it should be noted that, unless otherwise explicitly noted or required by context, the word "or" is used in this disclosure in a non-exclusive sense.

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

Figure 1:
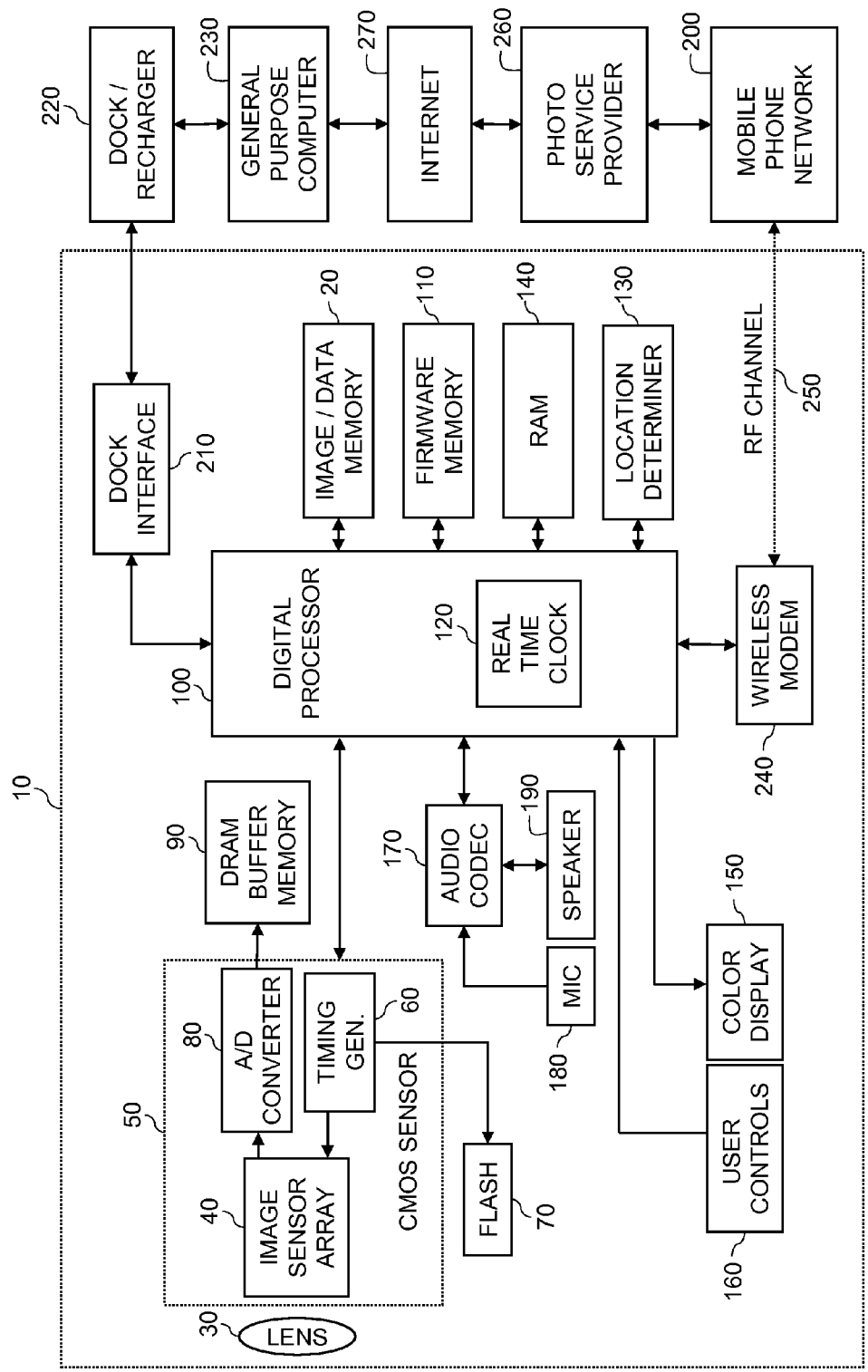
FIG. 1 is diagram of a system that can make use of the present invention.

FIG. 1 is a block diagram of a digital camera phone 10 based imaging system that can be used to implement the present invention. The digital camera phone 10 is one type of digital camera. The present invention can also be implemented for use with any other type of digital imaging device, such as other types of digital still camera or digital video cameras, or with any system that receives digital images.

Preferably, the digital camera phone 10 is a portable battery operated device, small enough to be easily handheld by a user when capturing and reviewing images. The digital camera phone 10 produces digital images that are stored using the image/data memory 20, which can be, for example, internal Flash EPROM memory, or a removable memory card. Other types of digital image storage media, such as magnetic hard drives, magnetic tape, or optical disks, can alternatively be used to provide the image/data memory 20.

The digital camera phone 10 includes a lens 30 that focuses light from a scene (not shown) onto an image sensor array 40 of a CMOS image sensor 50. The image sensor array 40 can provide color image information using the well-known Bayer color filter pattern. The image sensor array 40 is controlled by timing generator 60, which also controls a flash 70 in order to illuminate the scene when the ambient illumination is low. The image sensor array 40 can have, for example, 1280 columns×960 rows of pixels.

In some embodiments, the digital camera phone 10 can also capture and store video clips. Often the process of forming the video clips includes summing multiple pixels of the image sensor array 40 together (e.g. summing pixels of the same color within each 4 column×4 row area of the image sensor array 40) to create a lower resolution video image frame. The video image frames are then read from the image sensor array 40 at regular intervals, for example using a 24 frame per second readout rate.

The analog output signals from the image sensor array 40 are amplified and converted to digital data by the analog-to-digital (A/D) converter 80 on the CMOS sensor 50. The digital data is stored in a DRAM buffer memory 90 and subsequently processed by a digital processor 100 controlled by the firmware stored in firmware memory 110, which can be flash EPROM memory. The digital processor 100 includes a real-time clock 120, which keeps the date and time even when the digital camera phone 10 and digital processor 100 are in their low power state.

The processed digital image files are stored in the image/data memory 20. The image/data memory 20 can also be used to store aesthetic quality parameters determined using the method of the present invention. The image/data memory 20 can also store other types of data, such as photographer id, image of the photographer, rankings of photographers, and phone numbers.

In the still image mode, the digital processor 100 performs color interpolation followed by color and tone correction, in order to produce rendered image data, typically in the well-known sRGB color space. The digital processor 100 can also provide various image sizes selected by the user. The rendered sRGB image data is then JPEG compressed and stored as a JPEG image file in the image/data memory 20. The JPEG image file will typically use the well-known EXIF (EXchangable Image File Format) image format. This format includes an EXIF application segment that stores particular image metadata using various TIFF tags. Separate TIFF tags can be used, for example, to store the date and time the picture was captured, the lens F/# and other camera settings, and to store image captions. In particular, the ImageDescription tag can be used to store labels. The real-time clock 120 provides a capture date/time value, which is stored as date/time metadata in each Exif image file.

The location determiner 130 provides the geographic location associated with an image capture. The location determiner 130 may use any of a number of methods for determining the location of the image. For example, the geographic location may be determined from the location of nearby cell phone towers or by receiving communications from the well-known Global Positioning Satellites (GPS). The location is preferably stored in units of latitude and longitude. Note that the location determiner 130 may determine the geographic location at a time slightly different than the image capture time. In that case, the location determiner 130 can use a geographic location from the nearest time as the geographic location associated with the image. Alternatively, the location determiner 130 can estimate the geographic location at the time of image capture using geographic locations determined at times before or after the image capture time. This may be necessitated because it is not always possible for the location determiner 130 to determine a geographic location. For example, the GPS receivers often fail to detect signal when indoors. In that case, the last successful geographic location (i.e. prior to entering the building) can be used by the location determiner 130 to estimate the geographic location associated with a particular image capture. Alternatively, the geographic location can be estimated by interpolating between geographic locations determined at times before and after the image capture time.

The digital processor 100 can also create a low-resolution "thumbnail" size image, as described in commonly-assigned U.S. Pat. No. 5,164,831, entitled "Electronic Still Camera Providing Multi-Format Storage of Full and Reduced Resolution Images" to Kuchta, et al., the disclosure of which is herein incorporated by reference. The thumbnail image can be stored in Random Access Memory (RAM) 140 and supplied to a color display 150, which can be, for example, an active matrix LCD or organic light emitting diode (OLED). After images are captured, they can be quickly reviewed on the color display 150 by using the thumbnail image data.

The graphical user interface displayed on the color display 150 is controlled by user controls 160. The user controls 160 can include dedicated push buttons (e.g. a telephone keypad) to dial a phone number, a control to set the mode (e.g. "phone" mode, "camera" mode), a joystick controller that includes 4-way control (up, down, left, right) and a push-button center "OK" switch, or the like.

An audio codec 170 connected to the digital processor 100 receives an audio signal from a microphone 180 and provides an audio signal to a speaker 190. These components can be used both for telephone conversations and to record and playback an audio track, along with a video sequence or still image. The speaker 190 can also be used to inform the user of an incoming phone call. This can be done using a standard ring tone stored in firmware memory 110, or by using a custom ring-tone downloaded from a mobile phone network 200 and stored in the image/data memory 20. In addition, a vibration device (not shown) can be used to provide a silent (e.g. non audible) notification of an incoming phone call.

A dock interface 210 can be used to connect the digital camera phone 10 to a dock/charger 220, which is in turn connected to a general purpose computer 230. The dock interface 210 may conform to, for example, the well-know USB interface specification. Alternatively, the interface between the digital camera phone 10 and the general purpose computer 230 can be a wireless interface, such as the well-known Bluetooth wireless interface or the well-known 802.11b wireless interface. The dock interface 210 can be used to download images from the image/data memory 20 to the general purpose computer 230. The dock interface 210 can also be used to transfer information (e.g., calendar data) from the general purpose computer 230 to the image/data memory in the digital camera phone 10. The dock/charger 220 can also be used to recharge the batteries (not shown) in the digital camera phone 10.

It should also be noted that the present invention can be implemented in a combination of software and hardware and is not limited to devices that are physically connected or located within the same physical location. The digital processor 100 is coupled to a wireless modem 240, which enables the digital camera phone 10 to transmit and receive information via an RF channel 250. The wireless modem 240 communicates over a radio frequency (e.g. wireless) link with the mobile phone network 200, such as a 3GSM network. The mobile phone network 200 can communicate with a photo service provider 260, which can store digital images uploaded from the digital camera phone 10. These images can be accessed via the Internet 270 by other devices, including the general purpose computer 230. The mobile phone network 200 also connects to a standard telephone network (not shown) in order to provide normal telephone service.

The invention is inclusive of combinations of embodiments described herein. References to "a particular embodiment" and the like refer to features that are present in at least one embodiment of the invention. Separate references to "an embodiment" or "particular embodiments" or the like do not necessarily refer to the same embodiments: however, such embodiments are not mutually exclusive, unless so indicated or as are readily apparent to one of skill in the art. The use of singular and/or plural in referring to the "method" or "methods" and the like is not limiting.

Figure 2:
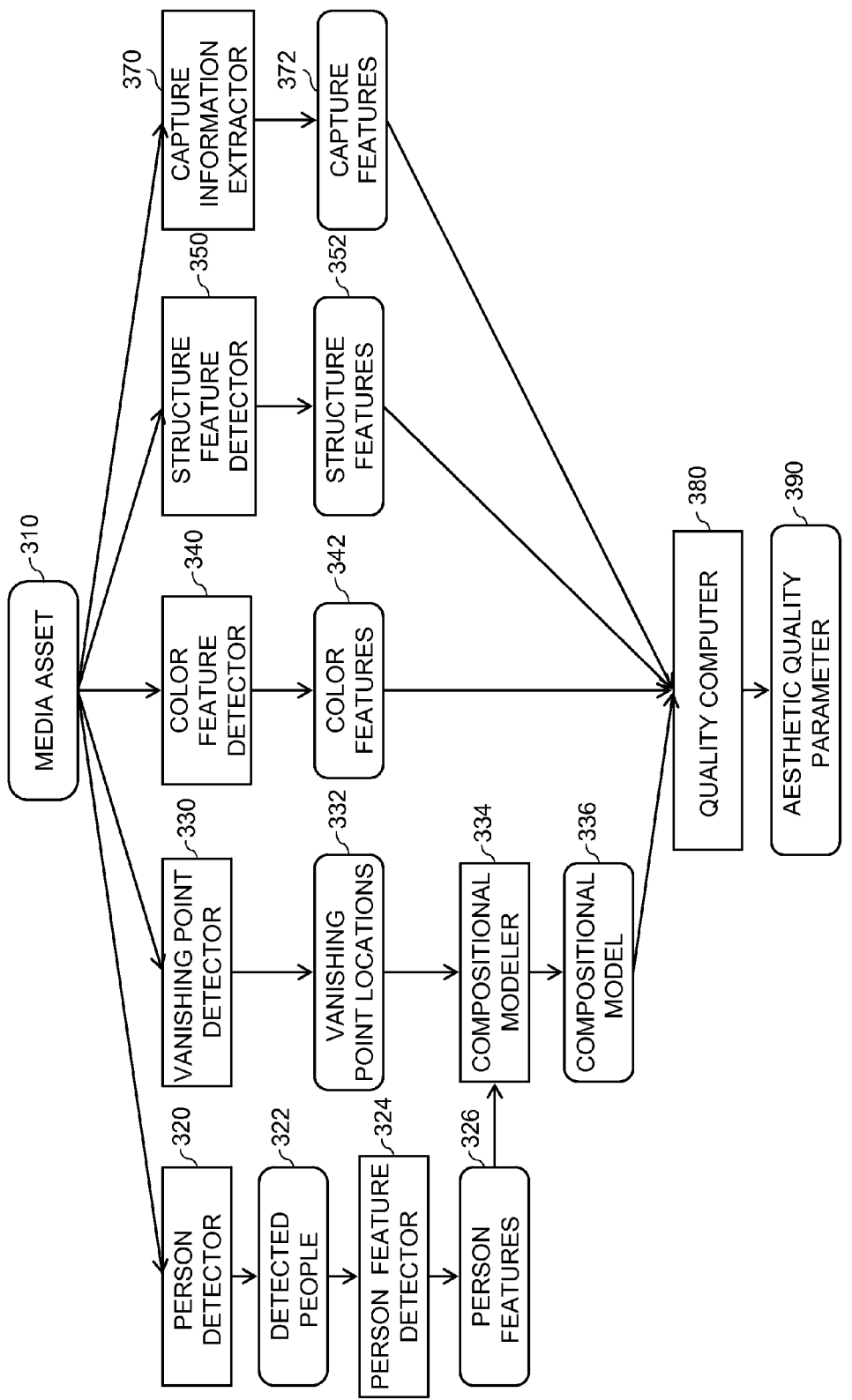
FIG. 2 is a flow diagram illustrating the determination of aesthetic quality parameters according to one embodiment of the present invention.

Referring now to FIG. 2, a method is described for determining an aesthetic quality parameter 390 for a media asset 310 according to an embodiment of the present invention. According to this embodiment, a collection of media assets 310 is present and an aesthetic quality parameter 390 is determined for each one. A variety of different person and main subject features (e.g., face location, face size, face contrast, face brightness, location of main subject, and size of main subject) are known to those skilled in the art and can be computed successfully with respect to the media assets 310 in accordance with the present invention. In the FIG. 2 embodiment, a person detector 320 is utilized to find detected people 322 in media assets 310. Preferably, detected people 322 are found using a face detection algorithm. Methods for detecting human faces are well known in the art of digital image processing. For example, a face detection method for finding human faces in images is described in the article "Robust real-time face detection" by Viola, et al. (Int. Journal of Computer Vision, Vol. 57, pp. 137-154, 2004). This method utilizes an "integral image" representation that consists of the immediate horizontal and vertical sums of pixels above a specific pixel location. Then, the full integral image can be computed as a successive summation over any number of array references. These rectangular features are input to a classifier built using the AdaBoost learning algorithm to select a small number of critical features. Finally, the classifiers are combined in a "cascade" so that the image background regions are discarded so that algorithms can operate only on face-like regions.

A person feature detector 324 is used to extract person features 326 for the detected people 322. Once a face is detected, the facial features (e.g. eyes, nose, mouth, etc.) can also be localized using well known methods such as described by Yuille et al. in, "Feature extraction from faces using deformable templates" (Int. Journal of Computer Vision, Vol. 8, pp. 99-111, 1992). This approach uses a method of using energy minimization with template matching for locating the mouth, eye and iris/sclera boundary. Facial features can also be found using active appearance models as described by Coates, et. al. in the article "Constrained active appearance models" (8th International Conference on Computer Vision, Vol. 1, pp. 748-754, 2001).

In the preferred embodiment, the method of locating facial feature points based on an active shape model of human faces described by Bolin and Chen in the article "An Automatic facial feature finding system for portrait images" (Proceedings of IS&T PICS Conference, 2002) is used.

It is well-known that a standard measure of the face size is the distance between the eyes which is a common output of most face detectors. The entire face can also be localized by using the x, y location of the eyes. Other common outputs of typical face detectors are the x,y image coordinates for vertices of a rectangular bounding box that encompasses the detected face. The face size can be estimated by the area of the bounding box.

Analysis is performed on the pixel values enclosed by the bounding box to determine face contrast and brightness. The contrast of the face is computed by first converting the image into a visual domain such as CIELAB (a well-known color spaces defined by the International Commission on Illumination, abbreviated as CIE). This color space consists of a lightness channel (L*) and two chroma channels, a* and b*. Brightness and contrast computations are performed on the lightness channel of the image contained by the bounding box area. A simple representation of the brightness of the face is computed using the mean of the lightness values (L*). The contrast of the face is computed using the standard deviation of the lightness values (L*).

Alternatively, other means can be used to compute contrast and brightness for complex images such as those described by Peli in "Contrast in Complex Images" (J. Opt. Soc. Am., Vol A7, pp. 2032-2040, 1990).

In the preferred embodiment of the present invention, the detected person features 326 include the size of the face, the location of the face, the contrast of the face, and the brightness of the face.

A main subject detection algorithm such as that disclosed in U.S. Pat. No. 6,282,317 to Luo et al. entitled "Method for automatic determination of main subjects in consumer images" can also be used in place of the person detector 320 to compute the location and size of any main subject. This method extracts regions of arbitrary shape and size defined by actual objects. It then groups the regions into larger segments corresponding to physically coherent objects, extracts structural and semantic saliency features, and integrates saliency features using a probabilistic reasoning engine into an estimate of a belief that each region is the main subject. The main subject belief map consists of a probability value P(x,y) as a function of the x,y image coordinates, where the estimate of belief is expressed as a probability value and is assigned to a grayscale value.

The location of the entire main subject is estimated by the centroid of the main subject weighted by the probability. The centroid $(C_x, C_y)$ of the main subject is computed as:

$$\begin{bmatrix} C_x \\ C_y \end{bmatrix} = \begin{bmatrix} \frac{\Sigma_n x_n(P(x_n, y_n))}{N} \\ \frac{\Sigma_n y_n(P(x_n, y_n))}{N} \end{bmatrix} \quad (1)$$

where $x_n$ and $y_n$ are the x and y image coordinates for the $n^{th}$ image pixel, and N is the total number of image pixels.

The size of the probable main subject is computed by counting the number of pixels for which P(x,y)>0.50. The size of the main subject should be measured as a fraction of the entire image to achieve invariance to scaling:

$$\text{size of main subject} = \frac{\text{number of main subject pixels}}{\text{number of total image pixels}} \quad (2)$$

A vanishing point detector 330 is utilized to find vanishing point locations 332 in the media asset 310. In a preferred embodiment of the present invention, the vanishing point detector 330 detects the vanishing point locations 332 using the method disclosed in U.S. Pat. No. 6,778,699 to Gallagher entitled "Method of determining vanishing point location from an image," which is incorporated herein by reference. This method includes detecting line segments; computing intersections from pairs of line segments; determining a local maximum corresponding to a plurality of probabilities; and outputting an estimated vanishing point vector VE that corresponds to the determined local maximum, such that an estimated vanishing point location 332 about the estimated vanishing point vector VE is determined.

In a preferred embodiment of the present invention, a compositional modeler 334 is used to create a compositional model 336 using the person features 326 and the vanishing point locations 332. The compositional model 336 is a representation of the composition type for the media asset 310.

The image composition is represented as a set of numbers such that person features 326, such as face size and face location, and vanishing point locations 332 that can be directly used by the compositional modeler 334 to create a compositional model 336. Alternatively, the compositional modeler 334 can transform the person features 326, the vanishing point locations 332, or both, into descriptive categories as a preliminary step in the creation of the compositional model 336. For example, the vanishing point locations 332 can be mapped to a set of vanishing point location categories such as horizontal, vertical, up, down, and center.

Figure 3B:
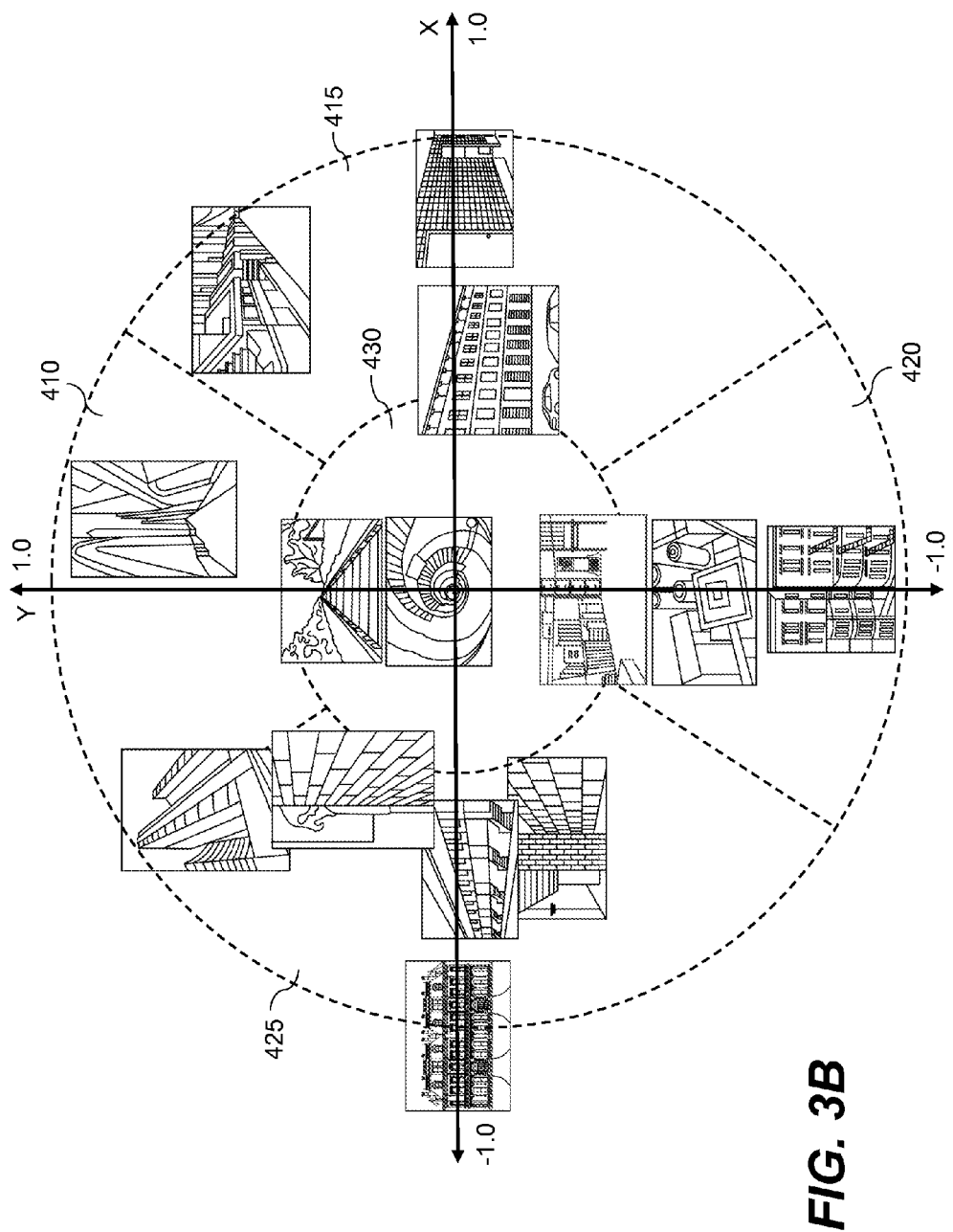
FIG. 3B is a diagram illustrating a coordinate system that represents vanishing point locations.

FIG. 3A shows an illustration of a vertical line vanishing point 400 and a horizontal line vanishing point 402 determined by intersecting lines detected in an image 404. FIG. 3B shows a diagram that represents vanishing point categories within an x,y coordinate system where x and y each range from −1.0 to 1.0. The images are positioned on the coordinate system based on the location of their dominant vanishing point when represented as a unit vector. The x-axis represents the x component of the dominant vanishing point and the y-axis represents the y component of the dominant vanishing point. The coordinate space is divided into five vanishing point regions representing different compositional models based on vanishing point analysis as shown in FIG. 3B. The top vanishing point region 410 contains images with vanishing point locations in the top portion of the image. The right vanishing point region 415 contains images with vanishing point locations in the right portion of the image. The bottom vanishing point region 420 contains images with vanishing point locations in the bottom portion of the image. The Left vanishing point region 425 contains images with vanishing point locations in the left portion of the image. The central vanishing point region 430 contains images with central vanishing point locations.

Figure 4A:
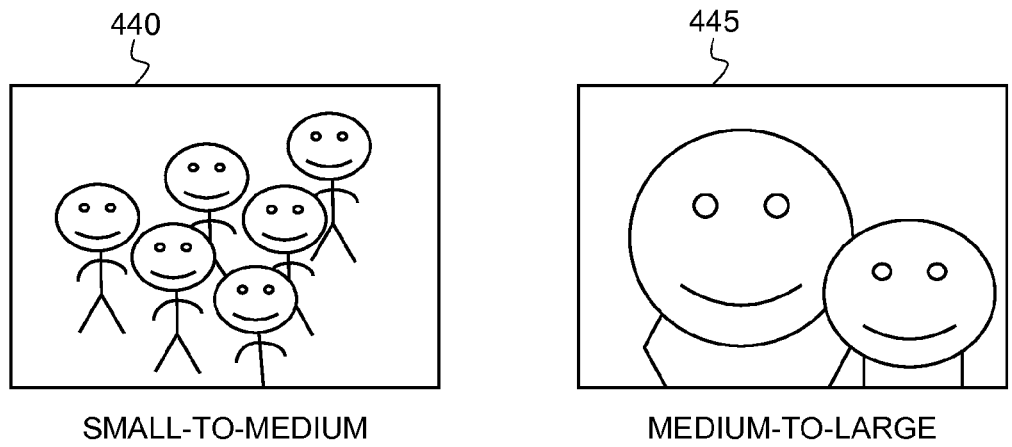
FIG. 4A is a diagram illustrating face size categories.

Similarly, the face size person features 326 can be mapped to a set of person size categories such as a small-to-medium category 440 and a medium-to-large category 445 as illustrated by FIG. 4A. Although other face size definitions can be used successfully with the current invention, a small-to-medium face size can be defined as the face consuming less than or equal to 10% of the image area and a medium-to-large face size can be defined as consuming greater than 10% of the image area as described by Cerosaletti, et al, in the article "Measuring the Perceived Aesthetic Quality of Photographic Images," published in the Proceedings of the QOMEX Workshop, 2009.

Figure 4B:
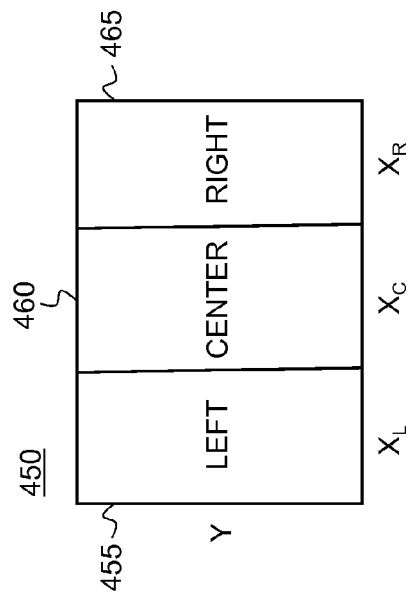
FIG. 4B is a diagram illustrating a compositional template.
Figure 4C:
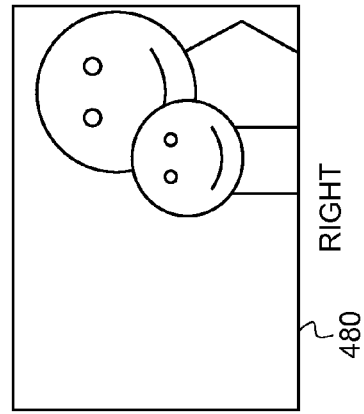
FIG. 4C is a diagram illustrating face location categories.
Figure 4C:
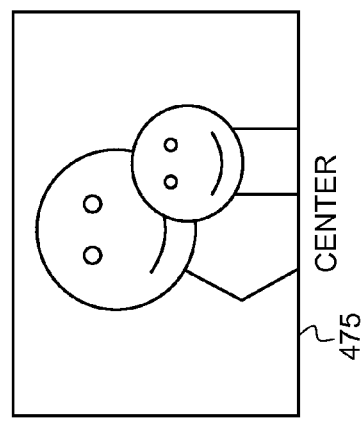
Figure 4C:
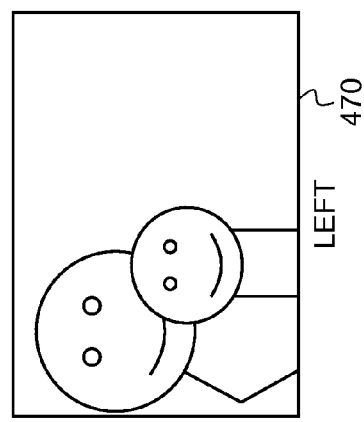

Likewise, the face location as a person feature 326 can be mapped to a set of person location categories through specifying an image compositional template 450 as shown in FIG. 4B. An image can be divided approximately into thirds by dividing the area of the image via the x dimension into linear segments to create a left region 455 with x values in the $x_L$ range, center region 460 with x values in the $x_C$ range, and a right region 465 with x values in the $x_R$ range. Other image divisions by different values or in both x and y dimensions can also be practiced effectively in accordance with this invention. FIG. 4C illustrates a left person location image 470 where the face locations fall in the left region 455, a center person location image 475 where the face locations fall in the center region 460, and a right person location image 480, where the face locations fall in the left region 465.

Figure 4D:
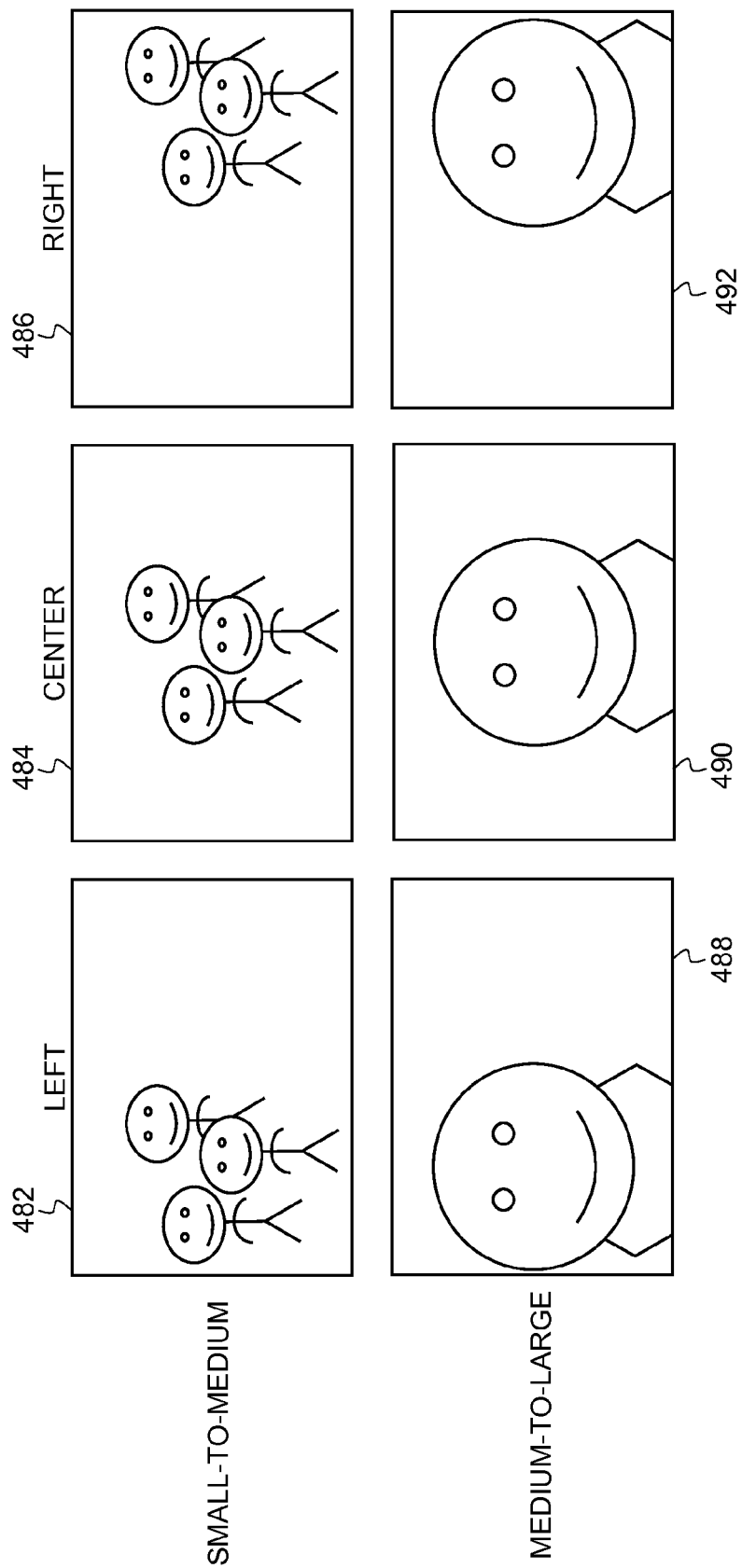
FIG. 4D is a diagram illustrating combined face size and location categories.

The face size and face location categories can be combined to form merged categories. For example, FIG. 4D illustrates images falling into 6 categories formed by merging the face size categories of FIG. 4A and the face location categories of FIGS. 4B and 4C: a small-to-medium/left category image 482, small-to-medium/center category image 484, a small-to-medium/right category image 486, a medium-to-large/left category image 488, a medium-to-large/center category image 490, and a medium-to-large/right category image 492. Other face location mappings can be used successfully with the current invention. Image compositional templates can be also used similarly to map the locations and sizes of the main subject or other objects in the media asset.

Figure 4E:
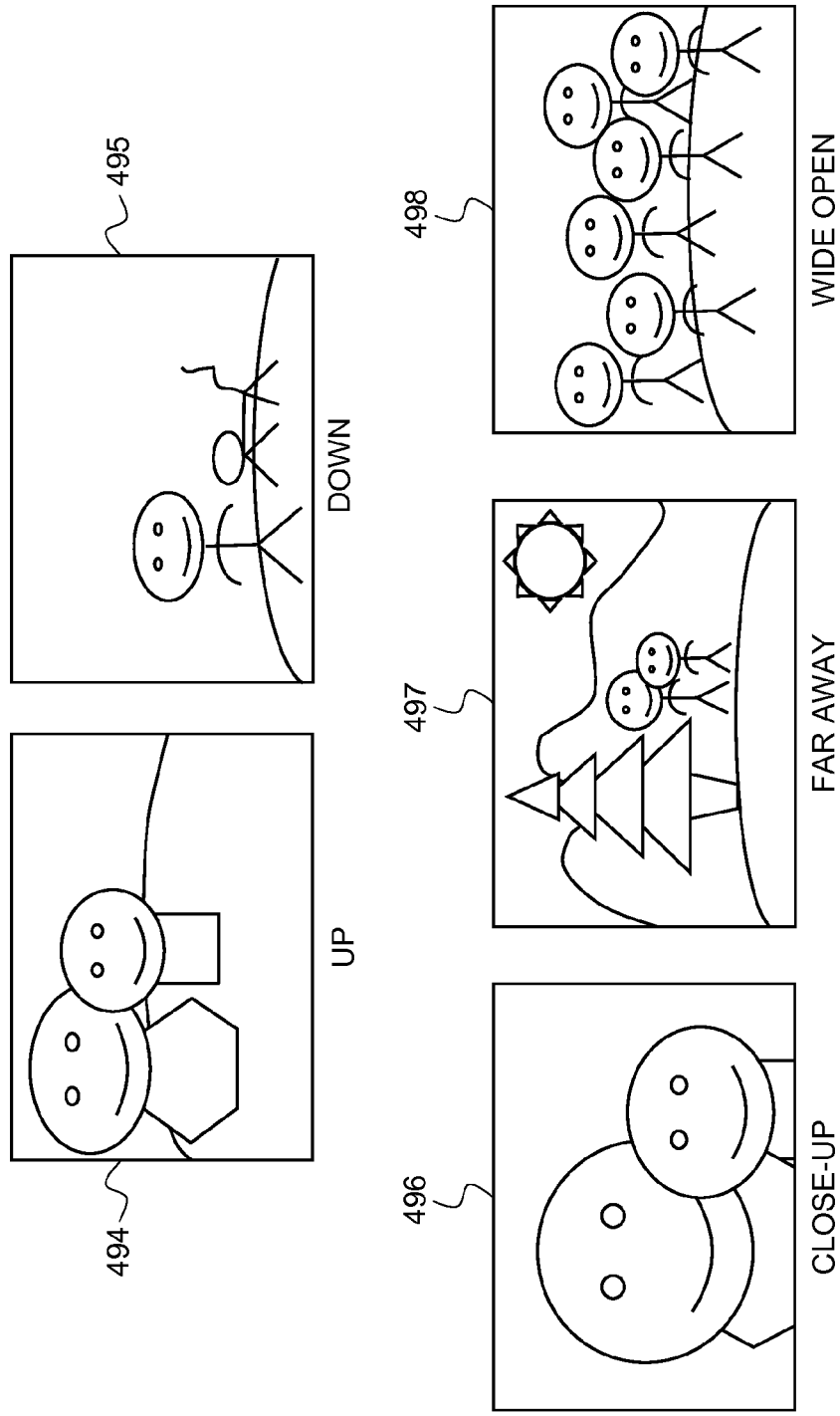
FIG. 4E is a diagram illustrating combined vanishing point location and face size and location categories.

The face size and face location categories and the vanishing point categories can be used separately or together in the compositional modeler 334. By mapping the person features 326 of face location and size as well as the vanishing point locations 332 in a combined manner to characterize the media asset 310, additional categories can be created by the compositional model. Some examples of those categories are: up, down, wide open, close-up, far away as shown in FIG. 4E. The up category 494 corresponds to the case when the vanishing point is near a person who is located at the top of the image. In this case, the camera was pointed up at the person. The down category 495 corresponds to the case when the vanishing point is near a person who is located at the bottom of the image. In this case, the camera was pointed down at the person. For the close-up category 496, the far away category 497 and the wide open category 498, the vanishing point is near the center of the image and the camera line of sight is parallel to the ground plane. The close-up category 496 corresponds to the case when the face size is medium-large. The far away category 497 corresponds to the case when the face size is small-to-medium. The wide open category 498 corresponds to the case when a picture of a group of people is taken and the face size is small-to-medium.

Those skilled in the art will recognize that a variety of different methods that can be utilized by the compositional modeler 334 to determine the compositional model 336 for a media asset 310 by combining the person features 326 and the vanishing point locations 332 in accordance with the present invention.

A color feature detector 340 is used to detect color features 342 in media asset 310. A variety of different color features 342 such as colorfulness, number of hues, and color distribution are known to those skilled in the art and can be computed for media asset 310 in accordance with the present invention. A method to compute a colorfulness value for media asset 310 is described by U.S. Pat. No. 6,671,405 to Savakis et al., which is incorporated herein by reference. In this method, image pixel values of the media asset 310 are converted to a luminance-chrominance color space and the chrominance plane is quantized into twelve chromaticity plane wedges or bins. Image pixels are associated with a particular bin based on the value of the pixel's chrominance component. For those active bins in which the number of high saturation pixels has exceeded a specified threshold, colorfulness C is computed as:

$$C = \frac{\min\{\text{Number of active bins}, 1.0\}}{10} \quad (3)$$

A method for calculating the number of hues that can be used in an embodiment of the present invention is described by Ke, et al. in the article "The design of high-level features for photo quality assessment" (Proc. Computer Vision and Pattern Recognition, 419-426, 2006). In this method, the number of hues is calculated by first converting image pixel values of the media asset 310 to the HSV color space and then, computing a 20-bin histogram using the H values which have saturation greater than 0.2 and brightness in the range of 0.15 to 0.95. The number of hues in a grayscale image is 1.

A method for calculating a color distribution that can be used in an embodiment of the present invention is described in the aforementioned article "The design of high-level features for photo quality assessment," by Ke, et al. In this method, the image is composed of red, green, and blue channels. The red, green, and blue channels are quantized into 16 values. A histogram is created that is composed of $4096=16^3$ bins to give the count of each quantized color present in the image. The histogram should be normalized to unit length to allow for absolute comparisons between media assets. A well-known $L_1$ statistical metric can be used to calculate the distance between histograms. Alternately, the histogram values can be used directly as color features.

A structure feature detector 350 is used to detect structure features 352 in the media asset 310. A variety of different structure features such as sharpness, and spatial distribution of edges are known to those skilled in the art and can be computed for media assets 310 in accordance with the present invention. One method of calculating a spatial distribution of edges is described in the aforementioned article "The design of high-level features for photo quality assessment," by Ke, et al. In this method, an edge spatial distribution feature extractor is implemented. A 3×3 Laplacian filter with $\alpha=0.2$ is applied separately to each of the red, green, and blue channels. Then, the mean is taken across the three channels. The Laplacian image is resized to 100×100 pixels and the image sum is normalized to 1 to allow for absolute comparison between images and within groups of media asset content categories such as images with people and images without people. The $L_1$ statistical metric can be used to calculate the distance between pairs of Laplacian images. Alternatively, the Laplacian image can be used to compute an image structure feature by measuring the amount of area that the edges occupy by computing the area of a bounding box that encloses a certain percentage (e.g., the top 96.04%) of the edge energy.

In a preferred embodiment of the present invention, the method of calculating sharpness features by using a sharpness detector as described in detail by U.S. Pat. No. 6,535,636 to Savakis et al., which is incorporated herein by reference, is used. Sharpness of a media asset 310 is found through converting the image to grayscale, detecting image edges, creating an edge histogram, finding the strongest-edge regions, computing statistics of strongest-edges, and using the average of the strongest edges as an estimate of sharpness.

A capture information extractor 370 is utilized to identify capture features 372 for a media asset 310. The capture information extractor 370 determines the capture features 372 related to the capture of the media asset 310, and outputs the resulting capture features 372. The capture features 372 can include, for example, the time the media asset 310 was captured, the focal length, the subject distance, the magnification, whether the flash was fired, whether the self-timer was activated, and the image resolution. Those skilled in the art will recognize a variety of different possible methods for the capture information extractor 370 to determine capture features 372. Often times, capture features 372 for are embedded in the file header of the media asset 310. For example, EXIF metadata can be used by the media capture device to store information associated with the capture of the media asset 310. For example, the "Date/Time" metadata entry is associated with the date and time the media asset 310 is captured. The capture information extractor 370 uses the most appropriate method for extracting the capture features 372 for the media assets 310. The capture feature of image resolution (i.e., the number of rows and columns of image pixels) is used as capture features 372 in a preferred embodiment of the present invention.

A quality computer 380 is used to compute an aesthetic quality parameter 390 responsive to the compositional model 336, the color features 342, the structure features 352 and the capture features 372 are processed by a quality computer 380 to output aesthetic quality parameters 390. Although certain embodiments have been thus described herein, the invention is not exclusive of other different forms of compositional models 336, color features 342, structure features 352 and capture features 372 that can be computed for a media asset 310. Those skilled in the art will recognize a variety of different compositional models 336, color features 342, structure features 352 and capture features 372 can be input to the quality computer 380 to compute aesthetic quality parameters. Further, it is not necessary for the quality computer 380 to utilize all of these different feature types in the computation of the aesthetic quality parameter. For example, in one embodiment of the present invention, only the compositional model 336 is used in the computation of the aesthetic quality parameter 390.

In a preferred embodiment of the present invention, the aesthetic quality parameter 390 is a single one-dimensional value, since this allows simpler comparisons between media assets. The resulting aesthetic quality parameters 390 can be associated with the media assets 310 by use of a database or can be stored as metadata in the media asset digital file.

A simplistic approach that the quality computer 380 can use to determine the aesthetic quality parameter 390 is to simply sum up equally valued or weighted inputs. However, preferably more sophisticated methods are used to determine the aesthetic quality parameter 390. In a particular embodiment, the quality computer 380 is a reasoning engine that has been trained to generate aesthetic quality parameters 390 through a classification process. In this embodiment, a separate model is trained for each composition expressed within the compositional model 336. In the reasoning engine, different input values, identified by respective inputs, can compete or reinforce each other according to knowledge derived from the results of the true aesthetic quality values from human observers-evaluations of real images. Competition and reinforcement are resolved by the inference network of the reasoning engine. A currently preferred reasoning engine is a Bayes net.

The true aesthetic quality values are gathered from human observers-evaluations of real images. By using empirical data collection methods, a psychometric experiment can be conducted in which human observers evaluate a variety of different images. For example, images can be rated using a 0 to 100-point scale bi-anchored with "lowest imaginable" and "highest imaginable" for aesthetically pleasing. The aforementioned features can then computed for all of these images. The image ratings are considered true aesthetic quality values and can then be provided as a training data set to the reasoning engine. The image ratings can also be clustered by the patterns of human observer responses utilizing techniques such as k-means clustering as described by Duda et al. in "Pattern Classification" (John Wiley and Sons, New York, 2001). These clusters can also be provided as a training data set to the reasoning engine.

A Bayes net is a directed acyclic graph that represents causality relationships between various entities in the graph, where the direction of links represents causality relationships between various entities in the graph. For a discussion of Bayes nets see, for example, "Causality: models, reasoning, and inference," by J. Pearl (Cambridge University Press, Cambridge, 2000). Evaluation is based on knowledge of the joint probability distribution function (PDF) among various entities.

The advantages of using a Bayes net include explicit uncertainty characterization, efficient computation, easy construction and maintenance, quick training, and fast adaptation to changes in the network structure and its parameters. A Bayes net consists of four components:
(1) Priors: The initial beliefs about various nodes in the Bayes net.
(2) Conditional Probability Matrices (CPMs): Expert knowledge about the relationship between two connected nodes in the Bayes net.
(3) Evidences: Observations from feature detectors that are input to the Bayes net.
(4) Posteriors: The final computed beliefs after the evidences have been propagated through the Bayes net.

Figure 5:
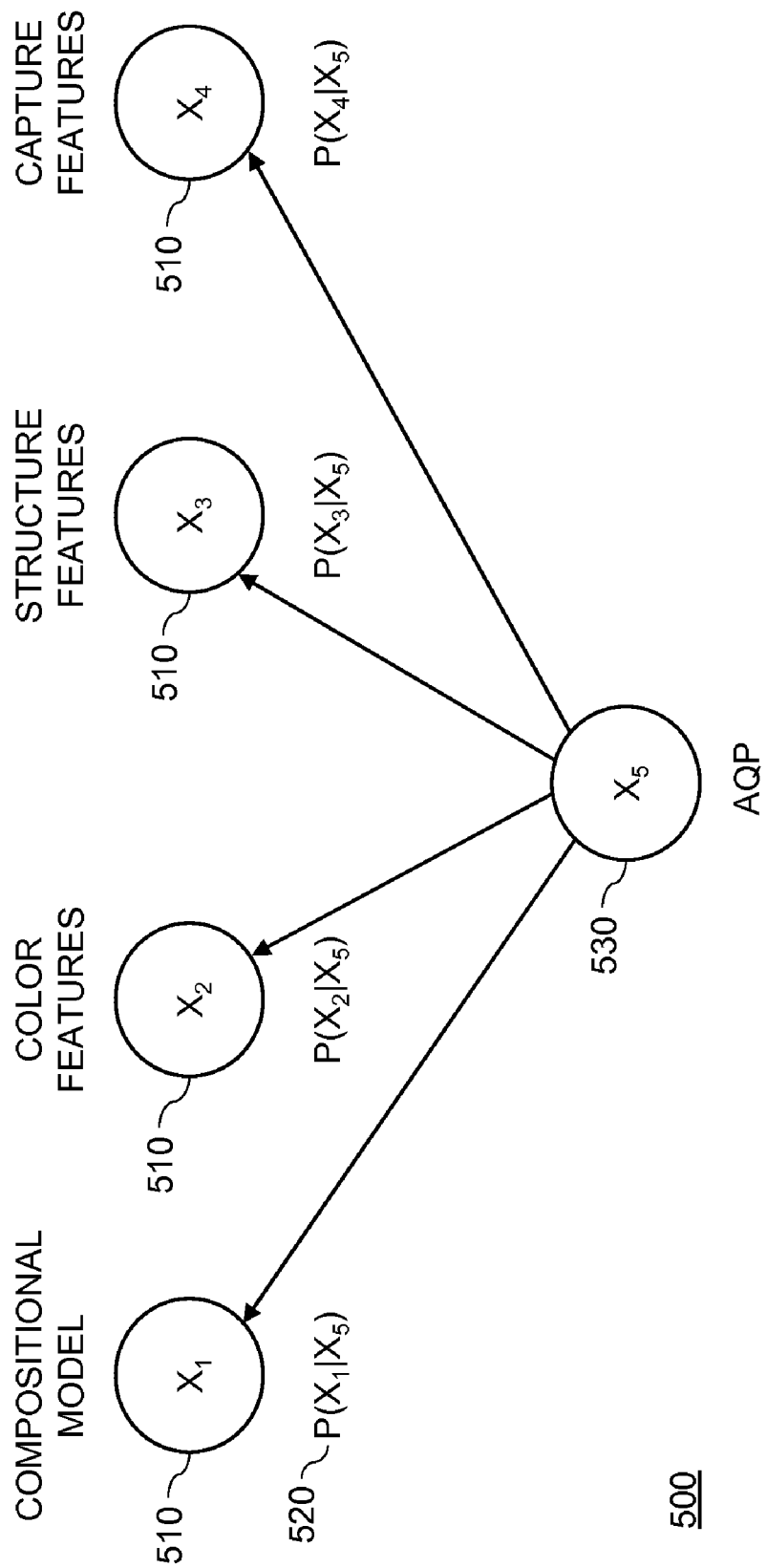
FIG. 5 is a diagram illustration a Bayes network.

There is one Bayes net active for each image record. It is expected that a simple two-level Bayes net can be used in the current system The most important component for training is the set of CPMs, because they represent domain knowledge for the particular application at hand. While the derivation of CPMs will be familiar to a person skilled in using reasoning engines such as a Bayes net, an exemplary Bayes net 500 is illustrated in FIG. 5. In this two-level Bayes net 500, an aesthetic quality parameter (AQP) is determined at the root node 530 given the various features as inputs at the leaf nodes 510. A conditional probability matrix 520 is expressed for each of the features.

It should be noted that each link is generally assumed to be conditionally independent of other links at the same level, which results in convenient training of the entire net by training each link separately, i.e., the CPM for a given link can be derived independent of all the others. This assumption is often violated in practice; however, the independence simplification makes implementation simpler and some inaccuracy can be tolerated. It also provides a baseline for comparison with other classifiers or reasoning engines, such as a Bayes net with more than two levels.

The probability distribution of $X_5$, which is measure of the aesthetic quality, can be calculated using the following equation:

$$P(X_1,X_2,X_3,X_4,X_5)= P(X_5)P(X_1|X_5)P(X_2|X_5)P(X_3|X_5)P(X_4|X_5) \quad (4)$$

The Bayes network expresses a joint probability distribution between a set of variables (in this case, the features $X_1$, $X_2$, $X_3$ and $X_4$ and the class variable that represents the aesthetic quality $X_5$) as a product of conditional probability factors (the aforementioned CPMs). From this representation, the marginal probability distributions of any variables can be found when some other subset of the variables are observed. For example, the features $X_1$, $X_2$, $X_3$ and $X_4$ are computed from an input image, and the posterior probability distribution of $X_5$ is found according to Bayes Rule as follows:

$$P(X_5 \mid X_1, X_2, X_3, X_4) = \frac{P(X_1, X_2, X_3, X_4, X_5)}{P(X_1, X_2, X_3, X_4)} \quad (5)$$

In this equation, the numerator of the fraction is simplified according to the conditional independence assertions of the Bayes Network. Meanwhile, because all of the feature values ($X_1$, $X_2$, $X_3$ and $X_4$) are observed, the denominator only serves to normalize (ensure the sum is 1.0) of the resulting posterior probability distribution over $X_5$. Therefore, we can write:

$$P(X_5|X_1,X_2,X_3,X_4) \propto P(X_5)P(X_1|X_5)P(X_2|X_5)P(X_3|X_5)P(X_4|X_5) \quad (6)$$

The aesthetic quality parameter 390 can be taken to be the most probable value of $X_5$ by finding the maximum in the posterior probability distribution of $X_5$. Alternatively, the aesthetic quality parameter 390 can be taken as the expected value of $X_5$, which can be calculated from the posterior probability distribution of $X_5$ as follows.

$$AQP = \langle X_5 \rangle = \int X_5 P(X_5|X_1,X_2,X_3,X_4) dX_5 \quad (7)$$

All the inputs are combined by the Bayes net to yield the aesthetic quality parameters 390. Different inputs may compete with or contradict each other. On the other hand, different inputs may mutually reinforce each other according to prior models or knowledge of typical photographic scenes. Both competition and reinforcement are resolved by the Bayes net-based inference engine.

One advantage of Bayes nets is that each link can be assumed to be independent of links at the same level. Therefore, it is convenient for training the entire net by training each link separately. In general, two methods are used for obtaining CPM for each root-feature node pair:
(1) Using Expert Knowledge: This is an ad-hoc method. An expert is consulted to obtain the conditional probabilities of each feature detector producing a high or low output given a highly appealing image.
(2) Using Contingency Tables: This is a sampling and correlation method. Multiple observations of each feature detector are recorded along with information about the emphasis or appeal. These observations are then compiled together to create contingency tables which, when normalized, can then be used. This method is similar to neural network type of training (learning).

Other reasoning engines may be employed in place of the Bayes net. For example, in the aforementioned text, "Pattern Classification" by Duda et al., a variety of different classifiers are described that can be used to solve pattern recognition problems, where having the right set of features is normally the most important consideration. Such classifiers include support vector machines (SVM), AdaBoost, linear discriminant analysis methods, flexible discriminants, (feed-forward) neural networks, non-parametric methods, and tree-structured classifiers. It will be obvious to anyone of ordinary skill in such methods that any of these classifiers can be adopted as the reasoning engine for practice of the present invention.

Figure 6:
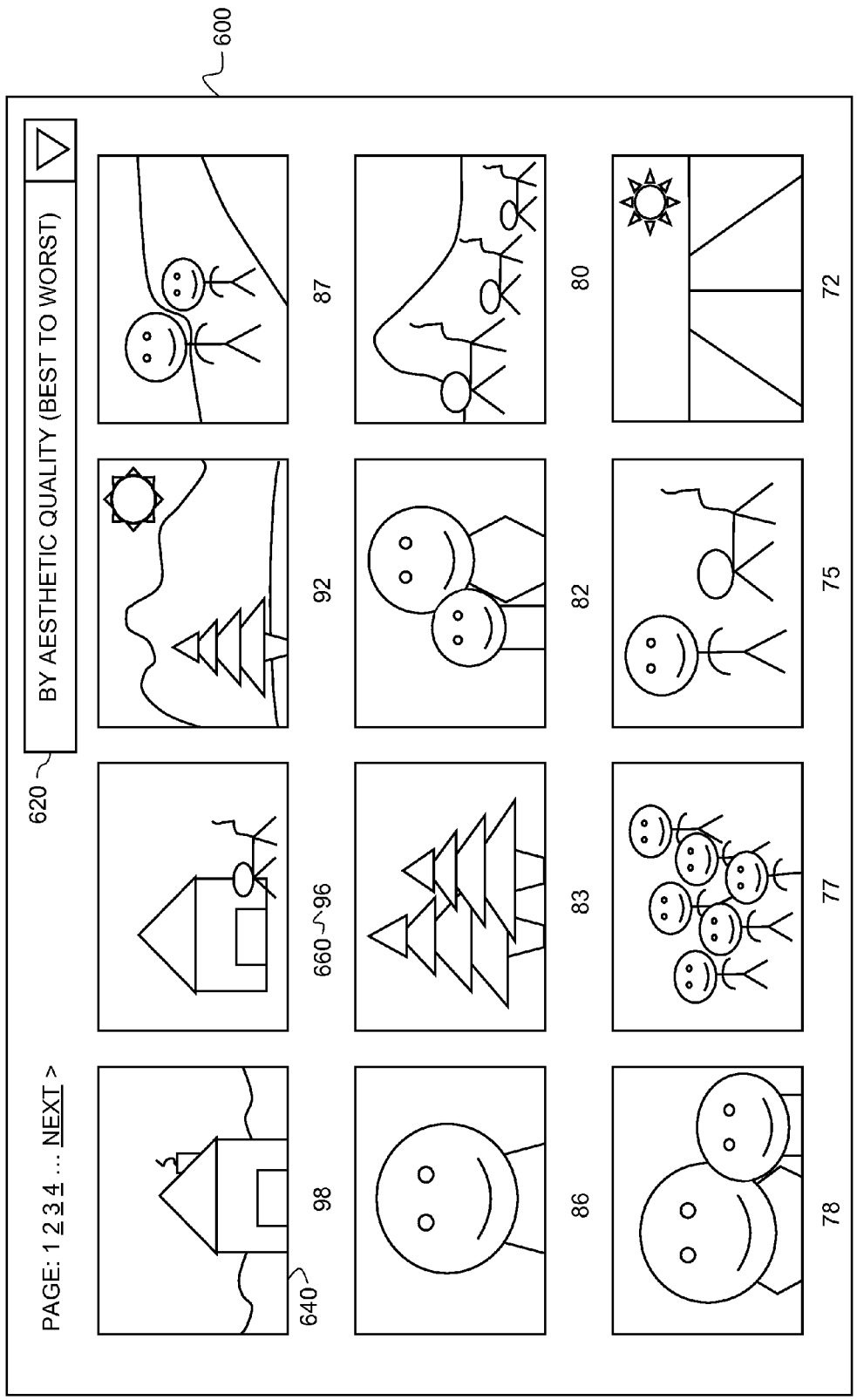
FIG. 6 is a diagram illustrating a user interface associated with an embodiment of the present invention.

FIG. 6 shows a possible user interface presentation area 600 that illustrates one application for aesthetic quality parameters 390 (FIG. 2) determined according the method of the present invention. A collection of media assets is acquired and the method shown in FIG. 2 is used to determine corresponding aesthetic quality parameters 390 (FIG. 2). The collection of media assets can be provided on a digital storage device such as a hard disk, an optical disk or a solid state memory device. Alternately, the collection of media assets can be provided using a digital communications network. Images are selected from the collection of media asset for display in the user interface presentation area 600. The images can include still images as well as frames extracted from video sequences. The user interface presentation area 600 is generated for presentation on a softcopy display, for example on a personal computer. In one embodiment, a user interface widget 620 in the form of a pull-down menu is used to indicate that the media assets 310 should be sorted by aesthetic quality from best to worst. The aesthetic quality parameters 390 associated with the media assets 310 are then numerically ordered to sort the media assets 310. In this embodiment, a set of sorted images 640 are displayed in the user interface presentation area 600 in order from highest aesthetic quality value to lowest aesthetic quality value, each image being labeled with its associated aesthetic quality value 660. Those skilled in the art will recognize that other user interface widgets such as dials, left-to-right arrows, and iconic representations can be used successfully with the current invention.

Other choices can also be provided for the user interface widget 620. For example, a choice to sort images chronologically from oldest to newest can be used to display a set of sorted images 640 in time order. As before, each image can be labeled with its associated aesthetic quality value 660. This can provide a visual representation of the aesthetic quality over time. By visually comparing the sorted images 640 and the associated aesthetic quality values 660 the photographer can evaluate his/her progress toward producing images with a high level of aesthetic quality.

Figure 7:
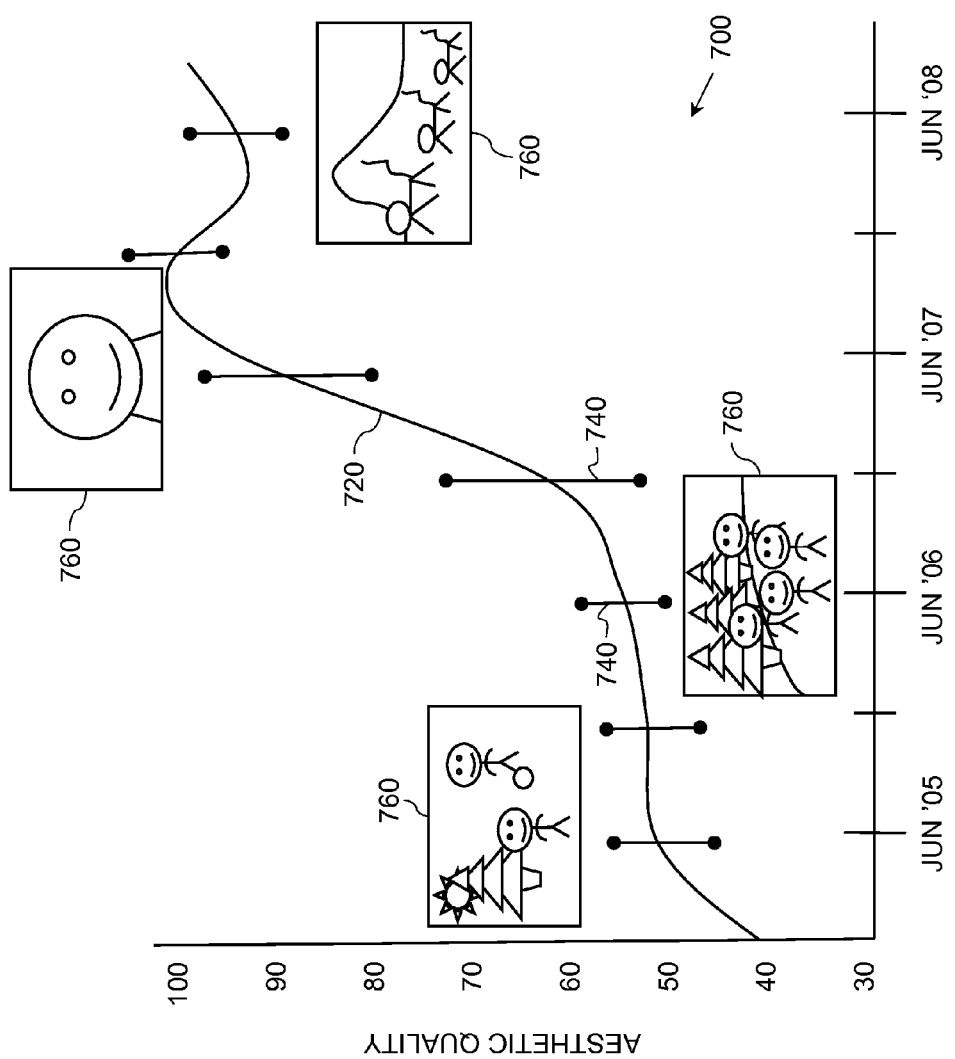
FIG. 7 is a diagram illustrating an information display associated with an embodiment of the present invention.

As another means to display aesthetic quality values 660, FIG. 7 shows a graph 700 which is a plot of aesthetic quality as a function of time. A curve 720 plotting the aesthetic quality as a function of time shows that aesthetic quality is generally increasing over time. To reduce randomness in the curve 720 the mean aesthetic quality for images within specified time intervals (e.g., months) can be plotted rather than the aesthetic quality for individual images. An indication of the variation in aesthetic quality at selected time intervals can be represented by variation bars 740 which, in this embodiment, show the coefficient of variation every six months. Representative images 760 can also be shown at selected time intervals. This plot of aesthetic quality as a function of time can be created for one particular photographer's media assets, as a composite of any number of photographers' media assets, or as a composite of media assets displayed on an image sharing website or through an online social network.

A social network is a social structure made of individuals (or groups of individuals) called "nodes," which are linked by one or more specific types of interdependency, such as friendship, kinship or relationships of beliefs, knowledge or prestige. In some cases, it can be convenient to use a graphical representation to illustrate the social relationships between people (or groups of people) in a social network. In such graphical representations, people are typically represented by vertices, and social relationships are represented by connections between the vertices. Two people in a social network are said to be "linked" if there is a connection between the vertices representing the people.

A number of internet sites have recently become popular for providing a way for members of a social network to communicate and share information with each other. These internet sites are sometimes referred to as online social networks.

To provide a metric of the photographer's progress over time, a progress score can be computed. The mean aesthetic quality for media assets captured over any desirable time range can be computed. Then, deviations between mean aesthetic quality values separated in time can be computed to create a progress score. Positive deviations between successive mean aesthetic quality values indicate positive progress and negative deviations between successive mean aesthetic quality values indicate a lack of progress for a particular photographer. It should be noted that other statistical measures can be used here, such as median or range. In another embodiment, a progress score is computed by performing a linear regression to the aesthetic quality values as a function of time over some time interval. The slope of the regression line can then be used as a progress score.

Aesthetic quality parameters determined according to the method of the present invention can be useful in the process of suggesting possible uses for images having high aesthetic quality and selecting specific media assets for use types such as printing, sharing, displaying. Media assets can also be used to produce specialty photographic products. Specialty photographic products include mugs, calendars, mouse pads, greeting cards, ornaments, and albums.

Figure 8:
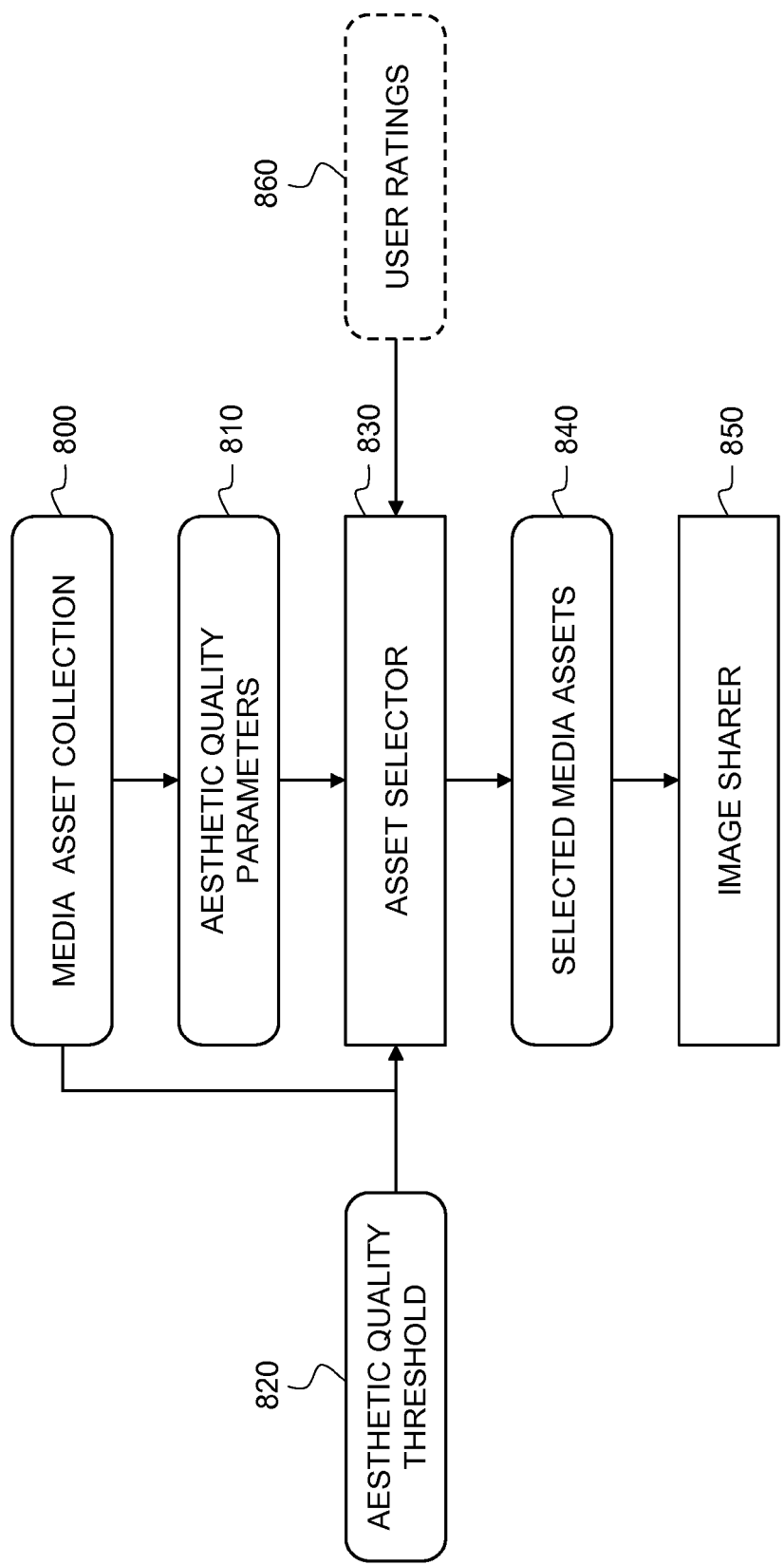
FIG. 8 is a flow diagram illustrating the use of aesthetic quality parameters according to one embodiment of the present invention.

FIG. 8 shows a flowchart of a method for selecting images for sharing based on identifying images that satisfy a threshold aesthetic quality criteria. Initially, aesthetic quality parameters 810 are computed for a media asset collection 800 using the method described above relative to FIG. 2. Next, an asset selector 830 compares the aesthetic quality parameters 810 to a specified aesthetic quality threshold 820 to determine a set of selected media assets 840 having aesthetic quality parameters 810 higher than the aesthetic quality threshold 820. For example, in one embodiment, the aesthetic quality threshold 820 could be an aesthetic quality value of "83." Then, the asset selector 830 will select the media assets in the media asset collection 800 having aesthetic quality parameters 810 larger than "83." Finally, the selected media assets 840 are shared using the image sharer 850. In one embodiment of the present invention, the asset selector 830 places the selected media assets 840 into a holding area such as an image data memory. The image sharer 850 can share the selected media assets 840 using any number of different methods for electronic sharing such as E-mailing them to a particular user or group of users, or uploading the selected media assets 840 to an image sharing website. Image sharing websites include online social networks. Those skilled in the art will recognize other means of sharing images that can be used successfully with this invention.

Optionally, user ratings 860 can be combined with aesthetic quality parameters 810 in the asset selector 830 to modify the aesthetic quality parameters 810 to take into account ratings directly obtained from the user. Examples of ratings are numerical ratings on a 100-value scale, where 100=excellent and 0=poor or star-value scales which show any number of stars, where many stars is excellent and few stars is poor. The asset selector 830 can be configured to always override the automatically determined aesthetic quality parameters 810 with user ratings 860 whenever they are specified, or alternatively can combine them by averaging them or using the larger of the two values.

When an input digital image is captured using a digital camera, feedback can be provided to the photographer regarding the aesthetic quality of the input digital image by displaying a quality indicator on a user interface of the digital camera. Continuous feedback in the form of a quality indicator could also be given while the photographer is framing the digital image such that the photographer could dynamically modify the framing to create the most aesthetically pleasing image.

Aesthetic quality parameters determined according to the method of the present invention can be useful in the process of providing feedback to a particular photographer regarding ways that the aesthetic quality of his/her digital images can be improved. Likewise, the particular feature or features of the digital image that had the most positive impact on aesthetic quality could also be identified to the photographer to provide positive feedback.

In one embodiment of the present invention, feedback can be provided to the photographer with respect to a particular image by determining which features could be changed to produce the largest improvement to the computed aesthetic quality parameter. For example, consider a particular image that is analyzed to determine a set of feature values (e.g., vanishing point location, face location, face size, colorfulness and sharpness), which are then used to determine a corresponding aesthetic quality parameter. Each of the feature values can be varied throughout their corresponding range of possible values to determine how the resulting aesthetic quality parameter would change. The critical feature or features that could be modified to produce the largest improvements in the aesthetic quality can then be identified to the photographer to provide feedback about how the aesthetic quality of the image could be improved.

In another embodiment of the present invention, a set of images captured by a particular photographer can be analyzed to determine the factors that most often have a negative or positive impact on the aesthetic quality. For example, it might be determined that a large fraction of the images could be improved by adjusting the image composition, but that most images were very good with respect to sharpness. In a variation of this method, the images that had the lowest aesthetic quality parameter values can be analyzed to determine how they could be improved. Likewise, the images that had the highest aesthetic quality parameter values could be analyzed to provide positive feedback about what the photographer did well.

Figure 9:
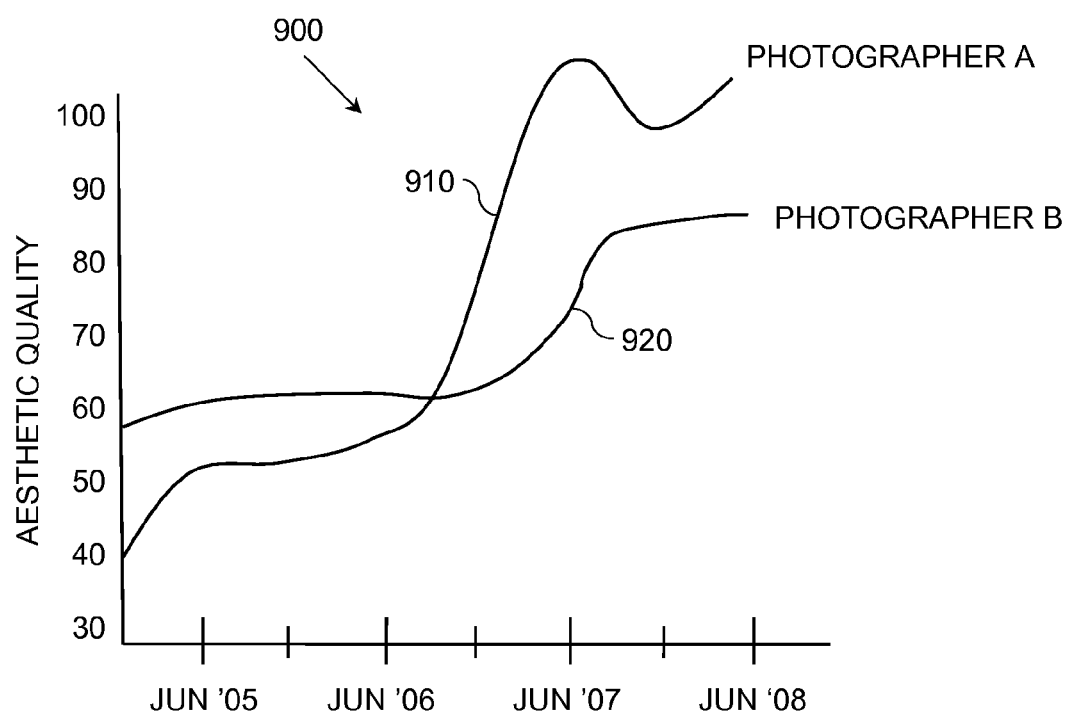
FIG. 9 is another diagram illustrating an information display associated with an embodiment of the present invention.

The method of the present invention can also be used to compare the quality of photographs captured by different photographers. For example, FIG. 9 shows an example of a graph 900 that can be used to compare the progress that two different photographers are making toward producing images with a high level of aesthetic quality. FIG. 9 is similar is content to FIG. 7, however, FIG. 9 contains the additional feature of comparing the aesthetic quality ratings for two different photographers. Curve 910 illustrates the relationship of mean aesthetic quality over time for photographer A and curve 920 illustrates the relationship of mean aesthetic quality over time for photographer B. It can be seen that photographer A is making faster progress at improving the aesthetic quality of his/her image relative to photographer B. In a similar fashion, the progress in the aesthetic quality over time can be compared for any number of different photographers. For example, a photography instructor could use this method to compare the progress of his students throughout a semester.

To provide a comparison of more than one photographer's progress over time, a progress score can be computed as described above for a plurality of photographers. The progress scores can be compared between photographers. In one embodiment, the progress scores for a set of photographers are shared using an online social network to which the photographers belong. For example, a group of photographers belonging to a photography club or taking a photography class together can form a special interest group in an online social network. The progress scores for the group of photographers can then be shared using the online social network to provide a mechanism for peer review.

Figure 10:
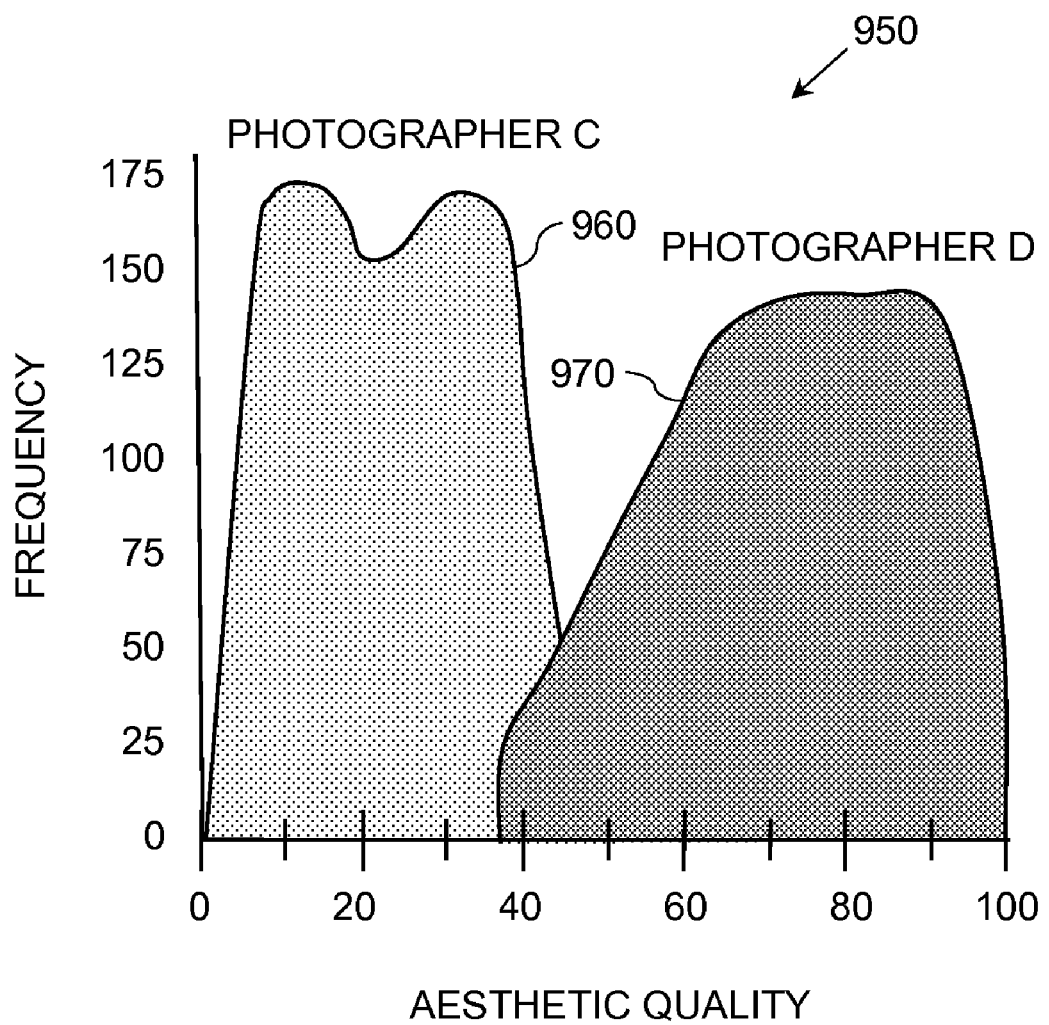
FIG. 10 is yet another diagram illustrating an information display associated with an embodiment of the present invention.

Similarly, FIG. 10 shows a graph 950 comparing the distribution of aesthetic quality values for two different photographers. Distribution 960 shows the aesthetic quality distribution for photographer C and distribution 970 shows the aesthetic quality distribution for photographer D. The aesthetic quality distributions represent histograms or probability density functions (PDFs) of the aesthetic quality parameters for images captured by the photographer during a specified time interval. In this example, it can be seen that the images produced by photographer D have a generally higher level of aesthetic quality than those of photographer C. In a similar fashion, the aesthetic quality distributions of media assets can be compared for any number of different photographers.

Aesthetic quality distributions can be determined for each photographer during a plurality of time intervals as a way to compare the progress of the photographers over time. For example, an aesthetic quality distribution can be determined for a series of consecutive months. The aesthetic quality distributions for each month can then be displayed using a graphical user interface as an indication of each photographer's progress toward producing images with a high level of aesthetic quality. Alternatively, statistics such as the mean and variance can be determined from the aesthetic quality distributions and used to provide an indication of each photographer's progress. The statistics can be displayed in graphical or tabular form for each of the photographers.

Figure 11:
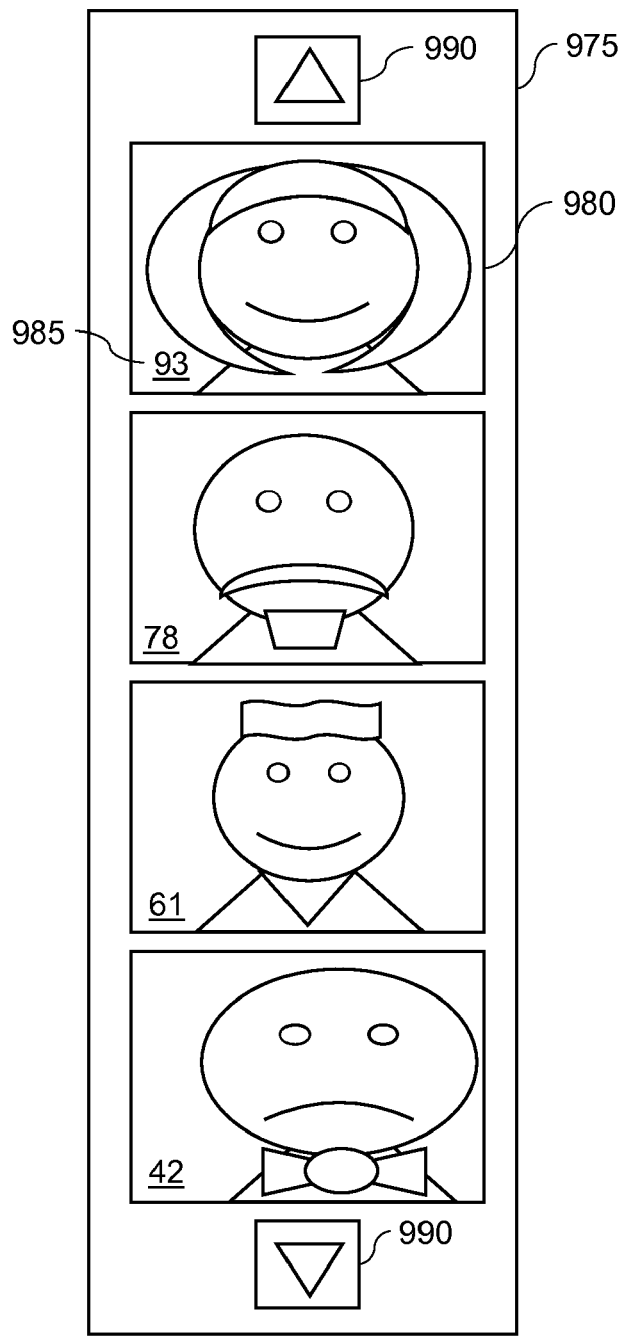
FIG. 11 is a diagram illustrating a user interface associated with an embodiment of the present invention.

FIG. 11 shows another user interface 975 in which aesthetic quality parameters 390 are used to compare photographers. In this case, the user interface 975 includes images of photographers 980 sorted by the mean aesthetic quality rating. Each of the images of photographers 980 is labeled with an aesthetic quality label 985 showing the mean aesthetic quality rating for that photographer. The user interface 975 depicts the ability to scroll through the images of photographers 980, using scroll arrows 990. It will be obvious to one skilled in the art that many other user interfaces can be designed to allow the comparison between the average aesthetic quality values for a set of photographers. For example, rather than showing images of photographers 980, the user interface can show a representative image taken by each of the photographers.

The invention has been described in detail with particular reference to certain preferred embodiments thereof, but it will be understood that variations and modifications can be effected within the spirit and scope of the invention.

PARTS LIST

10 Digital camera phone
20 Image/data memory
30 Lens
40 Image sensor array
50 CMOS sensor
60 Timing generator
70 Flash
80 A/D converter
90 DRAM buffer memory
100 Digital processor
110 Firmware memory
120 Real-time clock
130 Location determiner
140 RAM
150 Color display
160 User controls
170 Audio codec
180 Microphone
190 Speaker
200 Mobile phone network
210 Dock interface
220 Dock/recharger
230 General purpose computer
240 Wireless modem
250 RF channel
260 Photo service provider
270 Internet
310 Media asset
320 Person detector
322 Detected people
324 Person feature detector
326 Person features
330 Vanishing point detector
332 Vanishing point locations
334 Compositional modeler
336 Compositional model
340 Color feature detector
342 Color features
350 Structure feature detector 352 Structure features
370 Capture information extractor
372 Capture features
380 Quality computer
390 Aesthetic quality parameter
400 Vertical line vanishing point
402 Horizontal line vanishing point
404 Image
410 Top vanishing point region
415 Right vanishing point region.
420 Bottom vanishing point region
425 Left vanishing point region
430 Central vanishing point region
440 small-to-medium category
445 medium-to-large category
450 image compositional template
455 Left region
460 Center region
465 Right region
470 Left person location image
475 Center person location image
480 Right person location image
482 Small-to-medium/left category image
484 Small-to-medium/center category image
486 Small-to-medium/left category image
488 Medium-to-large/left category image
490 Medium-to-large/center category image
492 Medium-to-large/right category image
494 Up category
495 Down category
496 Close-up category
497 Far away category
498 Wide open category
500 Bayes net
510 Leaf nodes
520 Conditional probability matrix
530 Root node
600 User interface presentation area
620 User interface widget
640 Sorted images
660 Aesthetic quality value
700 Graph
720 Curve
740 Variation bars
760 Representative image
800 Media asset collection
810 Aesthetic quality parameters
820 Aesthetic quality threshold
830 Asset selector
840 Selected media assets
850 Image sharer
860 User ratings
900 Graph
910 Curve
920 Curve
950 Graph
960 Distribution
970 Distribution
975 User interface
980 Images of photographers
985 Aesthetic quality labels
990 Scroll arrows

The invention claimed is:

1. A method for comparing a plurality of photographers by assessing the aesthetic quality of a set of digital images captured by each photographer comprising:
   a) providing a set of digital images captured by each of a plurality of photographers;
   b) using a processor to determine an aesthetic quality parameter for each digital image in each of the sets of digital images, wherein the aesthetic quality parameter is an estimate for the aesthetic quality of the digital image;
   c) determining an aesthetic quality distribution for each photographer responsive to the aesthetic quality parameters computed for each of the digital images in the photographer's set of digital images; and
   d) providing a comparison between the aesthetic quality distributions of the photographers.

2. The method of claim 1 wherein the digital images in the sets of digital images are captured within a specified time interval.

3. The method of claim 1 wherein the aesthetic quality parameter for a digital image is determined by:
   i) determining one or more vanishing point(s) associated with the digital image by automatically analyzing the digital image;
   ii) computing a compositional model from at least the positions of the vanishing point(s);
   iii) computing the aesthetic quality parameter for the input digital image responsive to the compositional model.

4. The method of claim 3 wherein the aesthetic quality parameter produced in step iii) is further responsive to at least one of the following additional features that are computed from the input digital image: face location, face contrast, face brightness, face size, colorfulness, number of hues, color distribution, sharpness, edge spatial distribution, location of main subject, or size of main subject.

5. The method of claim 1 wherein the aesthetic quality distribution is a probability density function.

6. The method of claim 1 wherein step d) includes displaying the aesthetic quality distributions of at least two photographers via a graphical user interface.

7. The method of claim 1 wherein step d) includes determining a mean aesthetic quality value for each photographer from the aesthetic quality distributions, and displaying the mean aesthetic quality values via a graphical user interface.

8. The method of claim 1 wherein step d) includes determining a maximum aesthetic quality value for each photographer from the aesthetic quality distributions, and displaying the maximum aesthetic quality values via a graphical user interface.

9. The method of claim 1 wherein step d) includes ranking the photographers by comparing the aesthetic quality distributions for the photographers and displaying a list of the photographers ordered according to the ranking via a graphical user interface.

10. The method of claim 9 wherein the photographers are ranked by determining an average aesthetic quality value for each photographer from the aesthetic quality distributions and sorting the average aesthetic quality values.

11. The method of claim 9 wherein the displayed list of photographers includes an image of each photographer.

12. The method of claim 9 wherein the displayed list of photographers includes a representative image from each photographer.

13. The method of claim 1 wherein aesthetic quality distributions for each photographer are determined for two different time intervals and further including producing an indication of each photographer's progress toward producing images with a high level of aesthetic quality by comparing the aesthetic quality distributions for the two different time intervals.

14. The method of claim 1, wherein the plurality of photographers are a set of people linked in a social network, and wherein the comparison between the aesthetic quality distributions of the photographers is shared using an online social network.

15. The method of claim 1, wherein the plurality of photographers are students in a photography class.

16. The method of claim 1 wherein the sets of digital images are provided using a digital communications network.

17. The method of claim 1 wherein the sets of digital images include frames from one or more video sequences.

* * * * *